Figure 1:
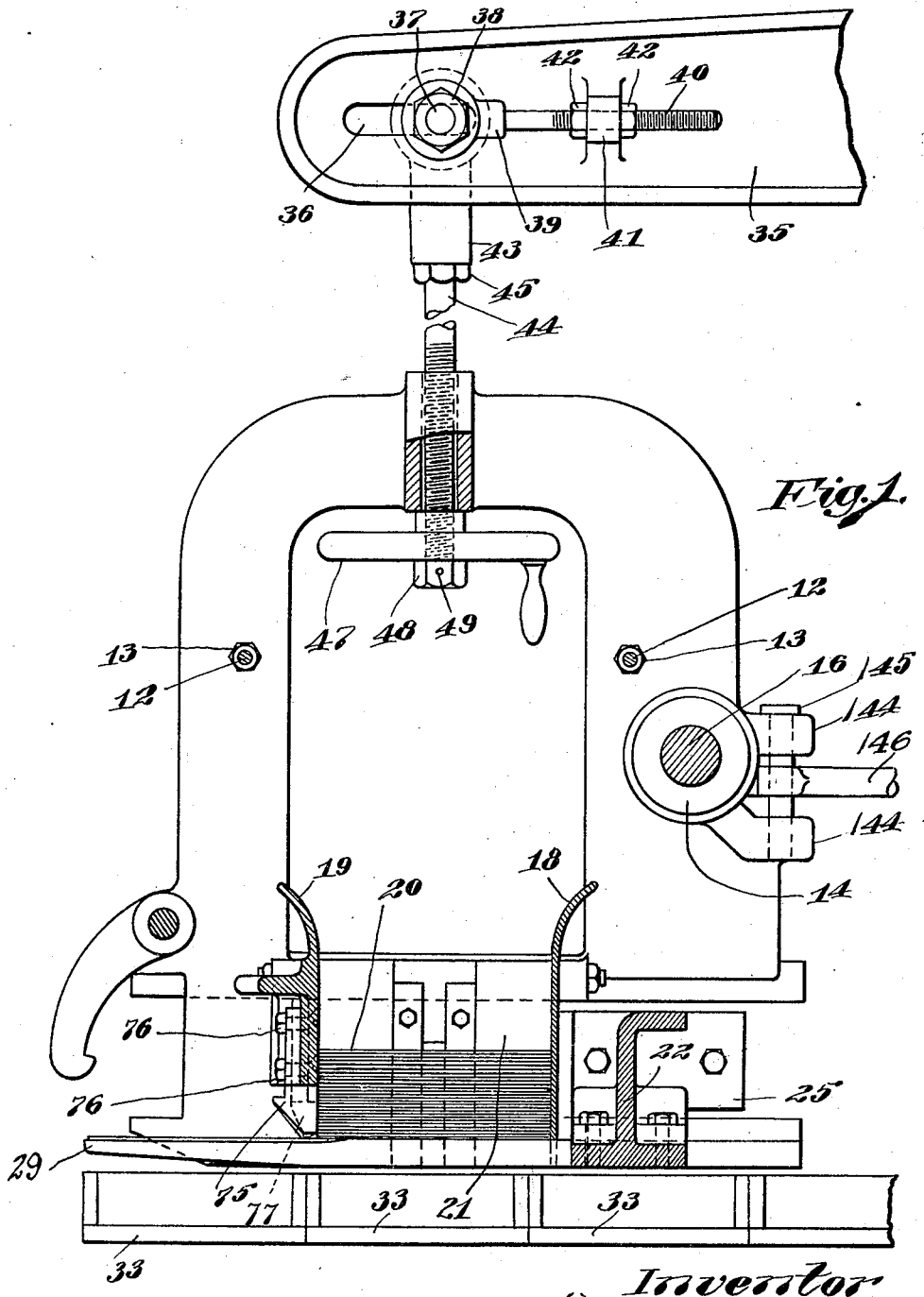

June 4, 1929. W. W. WALLACE 1,716,349
AUTOMATIC PALLET FEEDING MACHINE
Filed Aug. 6, 1924 2 Sheets-Sheet 1

Inventor
William W. Wallace
by James R. Hodder
Attorney

June 4, 1929. W. W. WALLACE 1,716,349
AUTOMATIC PALLET FEEDING-MACHINE
Filed Aug. 6, 1924. 2 Sheets-Sheet 2

Inventor
William W. Wallace
By James R. Hodder
Attorney

Patented June 4, 1929.

1,716,349

UNITED STATES PATENT OFFICE.

WILLIAM W. WALLACE, OF CHICAGO, ILLINOIS, ASSIGNOR TO NEW YORK BRICK HANDLING CORPORATION, OF NEW YORK, N. Y., A CORPORATION OF NEW YORK.

AUTOMATIC PALLET-FEEDING MACHINE.

Application filed August 6, 1924. Serial No. 730,447.

My present invention relates to brick making machinery, and more particularly to an automatic pallet feeding machine for feeding pallets to a brick molding machine.

In the manufacture of bricks by machinery, and particularly the so-called "soft mud" bricks, the clay is pressed in wooden molds through what is termed a jack mold. After the mold is filled, it is pushed out from under the jack mold and then bumped or jarred. Afterwards the pallet, which is a rectangular sheet of metal of appropriate width, length, and thickness, is dropped on the mold by hand. The mold is then turned over, getting the pallet on the bottom, and the mold is lifted off, leaving the brick on the pallet to be transported to a drier and afterwards built into a kiln where the burning process takes place. When running a soft mud brick machine to its full capacity, which is approximately 20–25 molds per minute, in order to be sure of always having a pallet at the required moment, it is necessary to feed such pallets from the magazine. While this is a necessary requirement, it has, so far as I am aware, never been successfully done before my entrance into this field and, therefore, it has heretofore been impossible to run a brick machine up to its full capacity.

In order to feed pallets from a magazine, such pallets must be taken from the bottom of the pile and such pile might be two or three high or even as high as twenty or thirty. Brick pallets are usually 10" wide, a scant ⅛" thick, and of a length to suit the brick mold. In developing brick machinery to increase the production of bricks, we have arranged a pallet so long that it is almost impossible to feed it by hand. The pallet employed in machine making of bricks is approximately 72" long by 10" wide by ⅛" thick and weighs twenty six pounds. By providing means for feeding the pallets to the brick machine automatically, we are able to increase the production of the brick machine approximately fifty percent.

Feeding pallets of metal of the size employed in the present instance is a radically different operation from feeding paper or any other straight material due, primarily, to the fact that, while paper, once fed from a magazine, is never again inserted in a magazine, in the case of pallets, such pallets are continually being used and after a very slight use become irregular in shape, some pallets in the middle will be bowed up and in some cases one end will be up and the other end down. The steel that such pallets are made from is too stiff to be pressed straight by the weight of the pallets above them. This cannot occur with regard to paper as, in feeding paper, the magazine usually has a flat, smooth bottom with grooves running crosswise thereof and in these grooves are fingers that are arranged to slide back and forth. The fingers project above the bottom the thickness of the sheets that are being fed and the result is a perfect machine for this class of work.

In designing my present apparatus, I have overcome the objectionable features in prior apparatus and have departed radically from the structure of magazines used for feeding paper. It would be impossible to employ a paper feeding device in the present instance as the slots where the sheets of paper pass out when pushed by the extracting fingers extend the length of the magazine and are just a fraction wider than the material passing out. It it were attempted to utilize such a machine for the feeding of brick pallets, it will be found that the pallets, coming back to the machine from the drier after the brick have been taken off, have more or less sand on them and are bowed up and down or irregular in shape, as described above. With the sand and scale to contend with, there can be no two members of the machine sliding one on the other as; if there were, it would be only a matter of a few minutes before the machine would be out of commission. In my present invention I have obviated the objections noted above and provide a magazine that is bottomless and provided with two reciprocating fingers located at the bottom of the magazine, spaced apart from each other to equalize the load and the fingers have a movement of more than the width of the magazine with the bottom pallets at all times resting on the fingers when in the magazine. The front portion of each of the fingers is reduced in thickness a fraction less than the thickness of the pallet. I also provide means for overcoming or preventing the slight offset, which engages the pallets, from filling up with sand or scale and therefore positively allow the outcoming pallet to drop down on the reduced end of the fingers.

Figure 2:
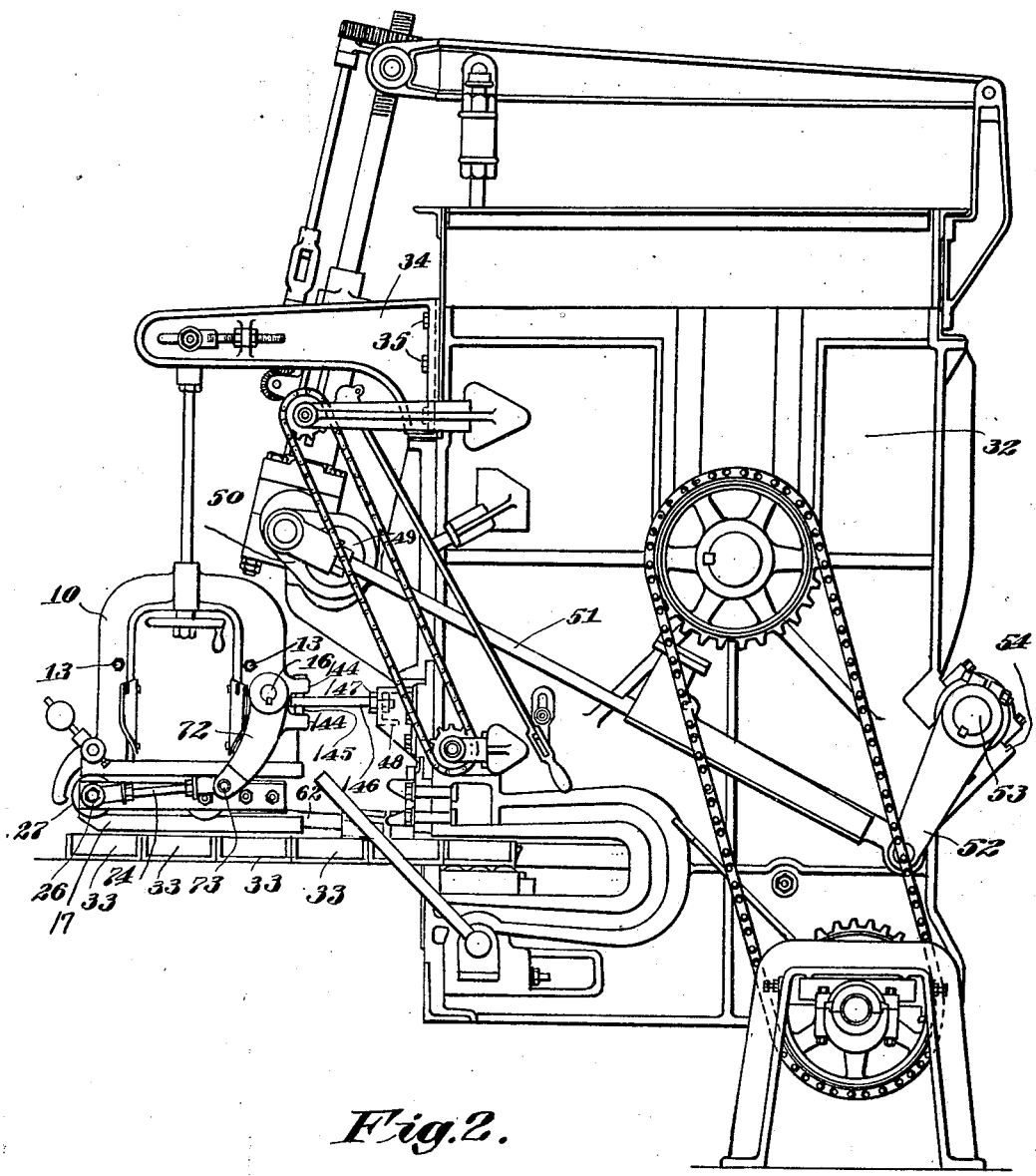

In the accompanying drawings illustrating the preferred embodiment of my invention as applied to a soft mud brick machine, Fig. 1 is a sectional side elevation, and Fig. 2 is a side elevation of my improved pallet feeding device attached to a brick machine, which also shows in side elevation.

Referring to the drawings, 10 designates a side frame member, which is held spaced apart and connected to a similar member by tie rods 12, such tie rods being threaded at their ends and provided with nuts 13 for securely holding them in position. Aligned bearings as 14 are formed in the side frame members, and in these bearings is rotatably mounted a shaft 16. Formed on the lower end of each of the side members and lying parallel with each other are tracks 17. Secured to the side members in any suitable manner is a back plate 18 and a front plate 19, these plates being spaced apart from each other, flared at their top and defining the sides or ends of a magazine in which pallets 20 may be piled and collected. Each of the side plates is provided with bearings 21 defining the ends of the magazine. Numeral 22 designates a reciprocating frame bar having secured at each end extending plates 25. Spaced apart on each side plate 25 are shafts 26 on which are rotatably mounted flanged wheels 27, such flanged wheels being adapted to run on the tracks 17. Secured to the reciprocating frame bar 22 in dovetailed slots are bridge fingers 29, there being preferably two of such bridge fingers lying parallel to, and spaced apart from, each other.

Referring to Fig. 2, numeral 32 designates a soft mud brick machine receiving power from any suitable source and such brick machine is adapted to fill in succession the brick molds 33 with soft mud clay or the like from which the brick are to be formed. As each brick mold 33 is filled, it is moved out from the front of the machine, or to the left as viewed in Fig. 2, and thus the molds 33 are fed out intermittently or step by step. My improved device is adapted to be associated with such a machine, and, in attaching the same, I provide at each side of the machine a bracket 34 which is attached to the machine by means of bolts 35. The forward end of each such bracket 34 is slotted at 36 and through which extends a shaft 37 threaded at its ends to receive nuts 38. Between each nut 38 and the bracket 35 is fitted on the shaft 37 the eye 39 having secured thereto a threaded member 40. This threaded member 40 passes through a perforation in a lug 41 formed integral with the bracket 35 and on either side of the lug 41 and threaded on the member 40 are adjusting nuts 42. Rotatably mounted on the shaft 37 and depending downwardly therefrom are link eyes 43, the lower end thereof being internally threaded to receive the upper threaded end of a connecting rod 44, an adjusting nut 45 holding the rod 44 in fixed position. The lower portion of the rods 44 are threaded to receive the threaded hub of hand wheels 47. To the lower end of the rods 44 are secured, by pins 49, the nuts 48 and with which the hand wheels 47 engage when in their lowermost position. It is obvious, from the above, that rotation of the hand wheels 47 in the proper direction will either raise or lower the side members with respect to the bracket 35 and also that, by properly manipulating the nuts 42, the shaft 37 carring the depending eyes 43 may be moved to the right or to the left, as viewed in Figs. 1 and 2, by means of the threaded bolt 40 connected with the eye 39 on the shaft 37. Adjacent to the bearings 14 for the shaft 16 and formed integral with the side members are spaced lugs 144, the lugs adjacent to each bearing 14 being drilled in alignment with each other for the reception of a headed bolt or shaft 145. The bolts 145 pass through an eye formed at one end of a rod 146, the end of the rod remote from the eye being threaded to receive the adjusting nuts 147 and such bolt is adapted to pass through perforations in the channel member 148 secured to the front portion of the brick machine 32. By means of the adjusting nuts 147 the frame members may be adjusted toward and from the front of the brick machine 32. It is obvious from the above that I have provided means for adjustably mounting and firmly holding in adjusted position relative to the brick machine 32 the side frame members 10 and 11 and all parts carried thereby as described and to be described.

Such method of connections of my improved device with the brick machine renders it possible to have easy access to the front of the brick machine and for this purpose it is simply necessary to back off one of the adjusting nuts 147 on each member 146 when the entire device may be swung around the shaft 37 as a center.

The magazine is bottomless and the finger bridges 29 are of a sufficient length so as to extend across the bottom of the magazine regardless of the extent of forward or backward movement of such finger bridges. Also the magazine is open at the front end except for two stripping fingers 75 which are secured to the front plate 19 by bolts 76 and pallet stops 77 slidably mounted in the front plate 19 and prevented from too far downward movement by a lock plate secured to the under face of the front plate 19. This insures a structure in which, as there are but two blocking points for the load (which consists of a plurality of pallets) I am able to provide means for taking sheets or pallets off the bottom of the pile regardless of their shape. The pallet stops 77 are engaged by the pallet as the same is forced from the bottom of the pile and such pallet will move the pallet stop 77 upwardly a sufficient distance to allow the passage of the pallet from the magazine. When the pallet has passed beyond the point of the stop 77, such stop will drop behind the pallet by gravity, and when the finger bridges 29 are drawn back under the magazine, the pallet removed from the pile will be prevented from returning to its initial position. Also, the pallet stops 77 will cause the pallets to be dropped from the sustaining finger bridges 29 in the same relative position each time.

While I have necessarily described and shown the preferred embodiment of my invention somewhat in detail, it is to be understood that I may vary the size, shape, and arrangement of parts within wide limits without departing from the spirit of the invention.

Having thus described my invention, what I claim as new is:

An improved magazine for brick pallets and the like and means for attaching the same to a brick machine, comprising a bottomless container, a plurality of reciprocatory fingers mounted at the bottom thereof, means for pivotally and adjustably mounting said bottomless container on a brick machine, and means connecting the bottom of said container with the brick machine for adjusting the magazine above a horizontal axis and with respect to the brick machine.

In testimony whereof, I have signed my name to this specification.

WILLIAM W. WALLACE.